July 8, 1941. H. FRAUENTHAL 2,248,615
BEARING MEANS
Filed March 19, 1938 2 Sheets-Sheet 1
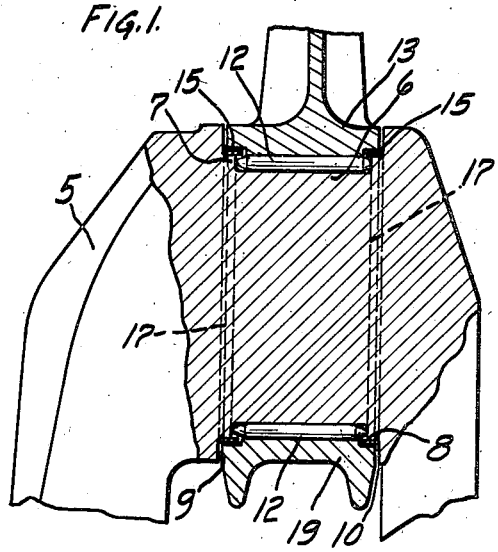
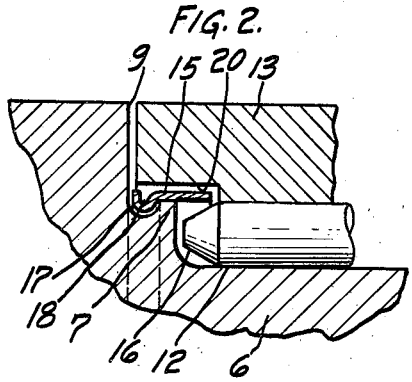
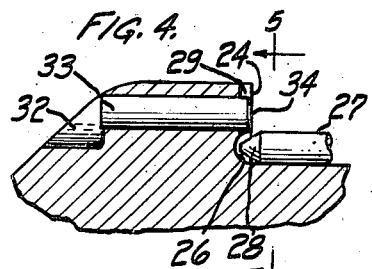
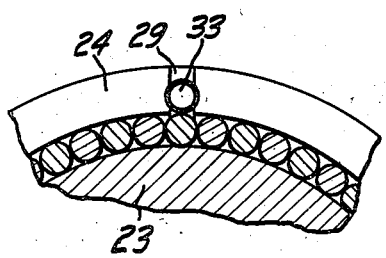
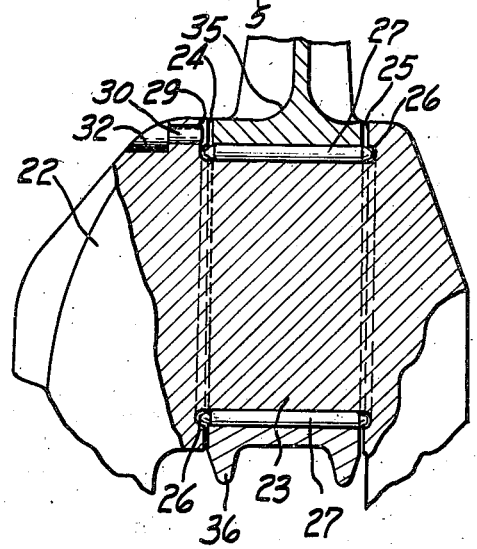
INVENTOR:
HAROLD FRAUENTHAL.
BY: Walter E. Schirmer
ATTY.

July 8, 1941.  H. FRAUENTHAL  2,248,615
BEARING MEANS
Filed March 19, 1938  2 Sheets-Sheet 2
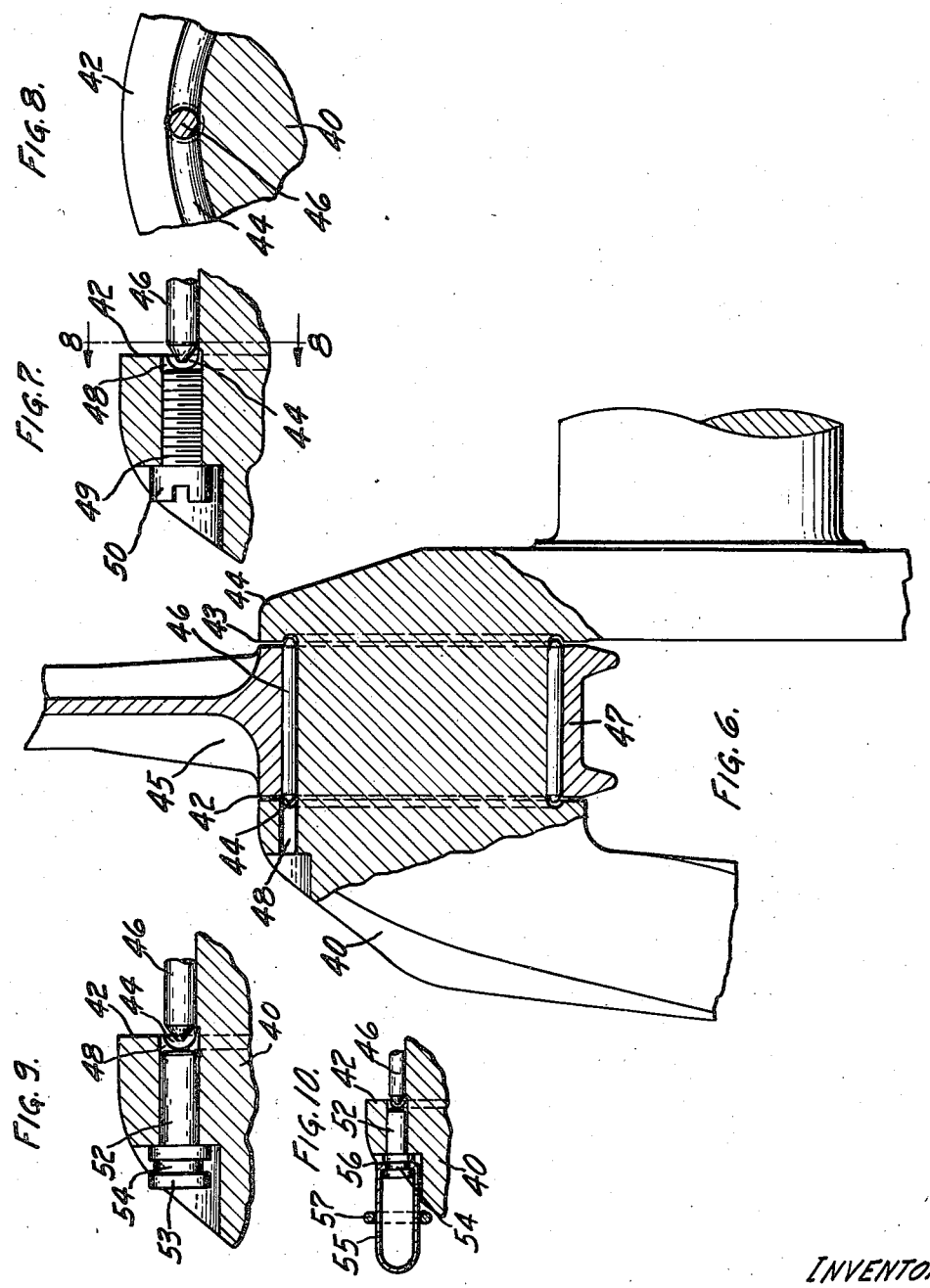
INVENTOR:
HAROLD FRAUENTHAL.
BY: Walter E. Schirmer
ATTY.

Patented July 8, 1941

2,248,615

UNITED STATES PATENT OFFICE 2,248,615

BEARING MEANS

Harold Frauenthal, South Bend, Ind., assignor to Bantam Bearings Corporation, South Bend, Ind., a corporation of Indiana Application March 19, 1938, Serial No. 196,818

5 Claims. (Cl. 308—207)

This invention relates to bearing means, and more particularly is directed to bearing means for crankshaft journals and the like in which needle bearings are employed for rotatably supporting the connecting rods, crank arms or the like on the crankshaft journals.

It has been proposed recently to supplant the well known Babbitt metal type of bearing, heretofore employed, by the use of needle bearing means. This has introduced serious problems of installation and assembly, and in its broader aspects, the present invention contemplates the reduction of such problems or their elimination.

One of the primary objects of the present invention is to provide anti-friction bearing means between an inner cylindrical bearing race defined by radially extending cheeks, and a member encircling said race between said cheeks, the bearing means comprising rollers retained by suitable means associated with said cheeks against outward displacement. The invention is applicable to all shaft constructions in which a splitting of the bearing member is required in order to assemble the bearing.

In a construction in which such bearings are employed it has been found extremely difficult to provide proper means for retaining the needle bearings in place as the crank arm or connecting rod is assembled about the journal. The present invention contemplates improved means for effecting this result whereby the needle rollers will be held in proper position independently of the crank arm or connecting rod.

One of the features of the present invention is the provision of suitable means cooperating with the roller members to permit their ready positioning about the bearing race, and which will serve to lock the same in position against displacement while still permitting the connecting rod or the like to be assembled to or disassembled from the assembly.

Another feature of the present invention resides in utilizing the cheeks on opposite sides of the journal as a means for retaining the anti-friction rollers in position.

Still another feature of the invention resides in the provision of means whereby the last few anti-friction rollers may be placed in position by movement axially of the raceway, and may then be moved circumferentially in the raceway and retained against outward displacement by means of cooperating grooves in the cheeks.

In a modified form of the invention, in which the bearing journal is hardened by an inductive hardening process and in which shouldered cheeks are provided in order to carry out such a process, it is contemplated to employ suitable retaining means which may be snapped or otherwise detachably mounted on the shoulders for retaining the rollers in position.

Other objects and advantages of the present invention will appear more fully from the following detailed description which, taken in conjunction with the accompanying drawings, will disclose to those skilled in the art the particular construction and operation of the preferred form of the present invention.

In the drawings:

Figure 1 is an elevational view, partly in section, of a bearing assembly embodying the present invention;

Figure 2 is an enlarged sectional view of a portion of the structure shown in Figure 1;

Figure 3 is a view corresponding to Figure 1 showing another modification of the present invention;

Figure 4 is an enlarged detail view of the structure shown in Figure 3 after the bearing members have been assembled in position;

Figure 5 is an end view taken substantially on line 5—5 of Figure 4;

Figure 6 is a view similar to Figure 1 showing another modification of the invention;

Figure 7 is a view corresponding to Figure 4 of the details of the structure shown in Figure 6;

Figure 8 is a sectional view taken on line 8—8 of Figure 7;

Figure 9 is a view corresponding to Figure 7 showing a still further modification of the structure shown in Figure 6; and Figure 10 is a view corresponding to Figure 9 showing a method of withdrawing the closure plug.

Referring now in detail to the drawings, I have indicated at 5 in Figure 1 a crankshaft having the crankshaft journal portion 6 which, on opposite ends thereof, is defined by the shoulder portions 7 and 8 formed in the cheeks 9 and 10 of the crankshaft 5.

In what is known as the "Tocco" process for hardening bearing surfaces, it is necessary to provide the shoulders 7 and 8 in order to obtain a hard face adjacent to the roller ends.

In the present invention I utilize the shoulder portions 7 and 8 as a means for retaining the anti-friction rollers 12 in position, independently of the bearing portion of the connecting rod or crank arm 13. After the rollers 12 have been partially placed in position about the circumference of the bearing surface 6, I provide a suitable spring clamp member indicated at 15, which is adapted to be snapped over each of the shoulders 7 and 8 and which extends axially inwardly of these shoulders to form a retaining flange overlying the tapered ends 16 of the rollers.

In order to retain the clamping members 15 in position the shoulders 7 and 8 are each provided with circumferentially extending outwardly directed grooves 17, and the clamping members 15 are provided along one side thereof with radially inwardly struck indentations spaced circumferentially thereabout as indicated at 18. When the band member 15 is snapped in position, the indentations 18 are adapted to engage within the groove 17 to retain the band 15 against axial movement relative to the shoulder. Preferably, the bands 15 are constructed of spring steel, and the split end thereof is adapted to be substantially flush or only slightly separated when the band is in position.

It will be apparent that the flange portions of the band members 15 overlying the tapered ends of the rollers 16 serve to prevent displacement outwardly of any of the roller members 12, and consequently retain these roller members in position independently of the crank arm or connecting rod 13. However, it will be noted that the connecting rod 13, as well as the bearing cap 19 thereof, are each axially recessed as indicated at 20 in Figure 2 to provide a clearance between radial inner surface of the recess and the band members 15, whereby the member 13 is supported for rotational movement directly upon the anti-friction rollers 12, and at no time comes into contact with either of the band members 15.

Considering now the modification of the invention shown in Figure 3, the crankshaft 22 is provided with a bearing journal portion 23 defined by radially extending cheek portions 24 and 25. Each of these cheek portions is defined with an axially directed annular groove 26 as indicated in detail in Figure 4, and the entire surface of the journal portion 23 is adapted to receive the anti-friction roller members 27 which are of a length greater than the axial distance between the cheeks 24 and 25, whereby the tapered ends 28 of the roller members project into the axial recesses 26 formed in the cheeks 24 and 25. It will thus be apparent that the roller members are retained against outward displacement when positioned with their opposite ends within the recesses 26.

In inserting the roller members in position they are preferably turned askew with respect to the cheeks 24 and 25 until the ends can be passed downwardly between these cheeks into a position such that, upon turning the roller straight, the ends thereof will move into the grooves 26.

In order to place the last few rollers 27 in position when there is no longer room for skewing the roller members in order to pass them down between the cheeks 24 and 25, it is necessary to provide some other means for moving the rollers into position on the bearing journal. In order to accomplish this, I provide a radially directed groove 29 in the face of the cheek 24, as indicated clearly in Figure 5, and provide an axially directed opening 30 in the crankshaft which passes from the recessed portion 32 into the groove 29. The last few rollers may be inserted by allowing the ends to drop down through slot 29, as shown in Figures 3 and 4, after first placing their opposite ends into recess 26. In order to prevent any possible outward displacement of the rollers after they have all been inserted in position, I provide a drive pin 33 as shown in Figures 4 and 5, which is driven into the opening 30 to position such that the end 34 thereof overlies the tapered end 28 of the roller which is in radial alinement therewith.

It is thus apparent that with this construction the rollers 27 are all located in such position that they cannot move outwardly with respect to the bearing surface 23 because of the engagement of the ends thereof in the recesses 26 in the defining cheeks of the journal. Also, since the rollers completely fill the circumferential gap between the connecting rod 35 and the bearing surface 23, there is no possibility for any roller member to become skewed in position, whereby its ends could be released from the grooves 26 and it could be displaced outwardly. Thus the construction shown in Figures 3, 4 and 5 positively insures retention of the roller member in position independently of the connecting rod 35 or its bearing cap 36, and also provides for direct bearing engagement of the connecting rod on the rollers without the necessity of forming recesses in the hub portion thereof as is necessary in the embodiment of the invention shown in Figures 1 and 2.

It will be noted that the opening 30 is disposed radially outwardly of the bearing surface so that the end 34 of the drive pin may over-lie the rollers to complete the peripheral surface of the associated groove 26.

In the embodiment of the invention shown in Figures 6 to 8, inclusive, the crankshaft 40 is provided with a bearing journal portion defined by the cheeks 42 and 43, each of which is provided with axial recesses 44 as described in connection with Figure 3. A suitable connecting rod 45 is adapted to be mounted for rotation on the anti-friction members 46 disposed between the cheeks and retained in position by means of the bearing cap 47. The rollers 46 are of an axial extent, including the tapered ends thereof, greater than the axial distance between the cheeks 42 and 43. Consequently, they must be positioned in the bearing journal by skewing into the grooves then moving them into axial alinement with respect to the journal with the ends thereof within the recesses 44. However, as noted in connection with Figure 3, it is impossible to place all of the rollers in position in this manner as the space in which the rollers may be skewed into position is too small after all but the last three or four rollers have been placed in position.

In order to place these last few rollers in position to complete the bearing complement, I provide the opening 48 in the crankshaft cheek 42, which is in direct axial alinement with the grooves 44. Through this opening 48, the members 46 may be passed axially into position and then moved circumferentially to make way for the next succeeding roller. After these last few rollers have been placed in position, it is necessary to provide some means for holding the last roller against axial movement outwardly through the opening 48, and for this purpose I may provide the threaded plug 49 shown in Figure 7 which may be threaded into the opening 48 to lock the last roller 46 in position. Preferably, the plug 49 is provided with a kerfed head 50 whereby a screw driver or similar tool may be used for threading the same into position. In this embodiment of the invention the end of the member 49 does not extend in a distance greater than the depth of the groove 44 so that a slight axial clearance is provided for each of the rollers. The end of the member 49 is preferably hardened and is disposed flush with the groove 44 for this purpose.

Considering the modification of the invention shown in Figure 9, similar reference numerals indicate similar parts. The opening 48 in this embodiment of the invention is closed by means of the drive pin 52, which is provided with a large head 53 having the annular groove 54 therein. In some cases, it may be advisable to withdraw the pin 52 to replace or remove the roller bearings 46, and for this purpose, I preferably provide a draw member comprising a U-shaped clip portion 55 having inturned ends 56 adapted to engage in the groove 54 and including a ring 56 enclosing the same, whereby suitable leverage can be obtained by the use of a screw driver or the like for exerting an axial outward pressure on the pin 52 by the engagement of the ends 56 in the groove 54 to thereby withdraw the pin to allow disassembly of the bearing.

It is therefore believed apparent that I have provided a novel type of bearing assembly whereby the needle bearings or suitable anti-friction bearing means to be employed in mounting connecting rods or crank arms on crankshafts or the like, is facilitated, and the holding of the antifriction roller members in position is provided independently of the connecting rod itself so that the connecting rod may be readily detached from the crankshaft without requiring any disassembly of the bearing members. The particular construction is particularly adapted for use in connection with automobile crankshafts or the like, and the axial grooves or other retaining means can be readily formed without any special machinery or fixtures. Further, the means by which the bearing assembly is locked against outward displacement, including the threaded nuts or drive pins, lends itself readily to disassembly of the bearings at any time without requiring operations outside of the removal of the pin members.

I am aware that various changes in details of construction of the component portions of the present invention may be made without in any way departing from the underlying principles of the present invention, and I therefore do not intend to be limited except as defined by the scope and spirit of the appended claims.

I claim:

1. A gearing assembly for a crankshaft journal defined by radially extending cheeks, comprising a plurality of anti-friction rollers, means forming axially directed annular recesses about said journal surface between said cheeks and of less radial extent than said cheeks, said rollers being positioned with the opposite ends thereof retained in said recesses against outward displacement, and means adapted for rotation on said rollers and including endwise axially recessed portions axially overhanging said recess forming means.

2. In combination, an inner bearing race comprising an annular surface defined at its lateral edges by radial shoulders, said shoulders in turn having external cylindrical surfaces terminated by radially projecting cheeks, each of said shoulders having a groove in the annular surface thereof adjacent the associated cheek, a plurality of antifriction rollers on said race and disposed between said shoulders, a pair of resilient bands adapted to be snapped over and supported by said shoulders and overhanging said race a sufficient distance to prevent outward displacement of said rollers, each of said bands having inwardly struck projections engaging in the associated groove to retain said bands against axial movement relative to said shoulders, and an outer bearing member extending axially between said cheeks and having a bearing surface disposed between said shoulders and journalled on said rollers, said members having axially recessed ends radially encircling said bands.

3. The combination, with a connecting rod having a transverse cylindrical bearing surface defined at its ends by radially enlarged axial recesses, of a crankshaft journal therefor comprising a bearing race of an axial extent greater than said rod bearing surface and defined at its ends by annular radial shoulders, a plurality of trunnion roller bearings completely filling the space between said surface and race and having their trunnion ends directly confined by said radial shoulders, axially extending cylindrical surfaces on said shoulders terminating in radial cheeks forming axial abutments for the connecting rod, and band retaining means secured against axial movement on said cylindrical surfaces and overlying the trunnion ends of said bearings, said recesses in said rod axially overlying said retaining means.

4. The combination, with a connecting rod having a transverse cylindrical bearing surface defined at its ends by radially enlarged axial recesses, of a crankshaft journal for said rod comprising axially spaced radial cheeks receiving the connecting rod and limiting axial movement thereof, annular integral cylindrical shoulders projecting toward each other from said cheeks and terminating in radial inwardly directed faces defining therebetween a bearing race, a plurality of needle rollers in said race rotatably supporting said rod bearing surface and having trunnion ends limited against axial movement by direct abutment against said radial faces, and retaining bands on said shoulders radially enclosed within said rod recesses and overhanging the trunnion ends of said rollers.

5. In combination, a crankshaft journal comprising a channel shaped inner bearing race, annular radially outwardly disposed surfaces directed axially outwardly of said race and terminating in radially outwardly directed cheeks, a connecting rod having a bearing portion axially confined between said cheeks and having a bearing surface projecting radially inwardly between the radial faces of said annular surfaces, a plurality of needle rollers rotatably journalling said bearing surface on said inner race and axially confined between said radial faces, and band means interlocked with said annular surfaces against axial movement and overhanging the ends of said rollers to restrain them against radial outward displacement, said bearing portion of said rod having axially recessed end portions defining said bearing surface so constructed and arranged as to axially overlie the band means on said annular surfaces.

HAROLD FRAUENTHAL.